April 18, 1967  J. R. COLSTON  3,314,294
TEMPERATURE MEASURING SYSTEM
Filed Oct. 4, 1963  2 Sheets-Sheet 1

INVENTOR
JOHN R. COLSTON

BY *Hurvitz & Rose*
ATTORNEYS

April 18, 1967  J. R. COLSTON  3,314,294
TEMPERATURE MEASURING SYSTEM
Filed Oct. 4, 1963  2 Sheets-Sheet 2

INVENTOR
JOHN R. COLSTON

BY Hurvitz & Rose
ATTORNEYS

United States Patent Office 3,314,294
Patented Apr. 18, 1967

3,314,294
TEMPERATURE MEASURING SYSTEM
John R. Colston, Silver Spring, Md., assignor to Bowles Engineering Corporation, Silver Spring, Md., a corporation of Maryland
Filed Oct. 4, 1963, Ser. No. 313,956
17 Claims. (Cl. 73—357)

This invention relates generally to temperature measuring systems, and more particularly, to a fluid system for converting fluctuations in temperature sensed by the system to differential pressure signals that are functions of these fluctuations in temperature. This application is related to my co-pending application, Ser. No. 299,985, filed on Aug. 5, 1963, entitled, "Pure Fluid Function Generating System," issued on May 10, 1965, as U.S. Patent No. 3,250,469.

The present invention utilizes basically two phenomena pertaining to the behavior of gases. First, the present invention utilizes the phenomenon that the viscosity of a gas increases as the temperature increases; and second, that the relationship between viscosity and temperature for gases is essentially a linear relationship over relatively small increments of temperature range.

In the utilization of both phenomena, the present invention in its simplest form contemplates a fluid circuit for conveying fluid pressure signals, the circuit including a pair of tube sections connected in parallel and joined together at one end thereof to a common source of gas at constant pressure. A pair of orifice-type flow restrictions are formed in one tube section and a laminar-type flow restriction and an orifice-type restriction are formed in the other tube section. As will be discussed in greater detail subsequently, a pair of orifice restrictions create a region therebetween of essentially constant pressure in the one tube section, whereas the laminar flow restriction and the associated orifice restriction cooperate to create a region therebetween of increasing or decreasing pressures, the varying pressures being functions of gas temperature increases or decreases, respectively, in the other tube section.

The tube sections are each coupled to issue pressure signals to a control nozzle of a conventional pure fluid amplifier of the analog type, the amplifier effecting comparison and amplification of the pressure signals issuing from each section. The differential pressure output of the amplifier is a function of changes in temperature of the gas flowing in the tube sections.

An orifice-type of flow restriction element is so-called because it offers a resistance or impedance to flow by means of an orifice or any other restriction that has the same pressure-flow characteristic. A suitable orifice restriction for the purposes of this invention may, for instance, be provided by a tapered nozzle having "simple orifice characteristics," the terms "simple orifice characteristics" being defined in the subsequent detailed description of the invention. An important characteristic of this type of restriction for the purposes of this invention is that the resistance offered by the orifice restriction to volume flow of gas decreases with temperature increases because the density of a gas decreases with temperature increases.

The second type of restriction element utilized in the present invention is designated and hereafter referred to as a "laminar flow restriction" and may be formed by a series of plates, capillary tubes or rods arranged parallel to the direction of fluid flow, or by a porous plug inserted in a tube or channel conveying the gas. An important characteristic of this type of restriction for the purposes of this invention is that the resistance offered by the restriction to volume flow of gas increases as the viscosity and temperature increase and decreases as the viscosity and temperature decrease.

A conventional analog type of pure fluid amplifier employed in this invention typically comprises a power nozzle, which supplies a power stream into a confined interaction chamber and a pair of substantially opposed control nozzles that issue control streams essentially transversely of the constricted power stream and in interacting relationship therewith so as to effect amplified displacement of the power stream relative to a pair of fluid receiving output passages or tubes located downstream of the interaction chamber. The amplified directional displacement of the power stream by control streams in an analog type of pure fluid amplifier is linear; that is to say, an essentially linear relationship exists between a change in an output fluid parameter such as pressure or flow for a corresponding change in the respective control fluid parameters supplied to the control nozzles of the analog-type fluid amplifier.

Broadly, it is an object of this invention to provide a system for measuring the temperature of fluid flowing through the system, the system comprising a combination of orifice and laminar types of flow restrictions arranged in a tubing system such that the system produces pressure signals corresponding to fluctuations in the fluid temperature.

More specifically, it is an object of this invention to provide a system for measuring the temperature of fluid flowing therethrough, the system comprising a pure fluid amplifier of the analog-type including a pair of control nozzles coupled to the output ends of a system of tubes or passages having orifice and laminar types of flow restrictions therein, the restrictions being constructed and arranged such that the tubes issue fluid pressure signals corresponding in amplitude to changes in the temperature of the flow in the tubes.

The above and still further objects, features and advantages of the present invention will become apparent upon consideration of the following detailed description of several specific embodiments thereof, especially when taken in conjunction with the accompanying drawings, wherein.

Figure 4:
Figure 5:
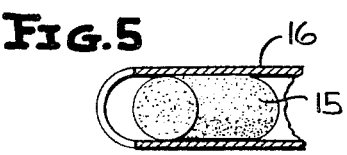
Figure 5A:
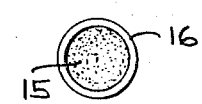
Figure 8:
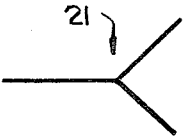
Figure 6:
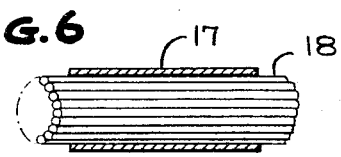
Figure 6A:
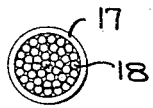
Figure 7:
Figure 7A:
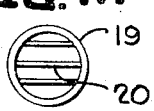
Figure 9:
Figure 10:
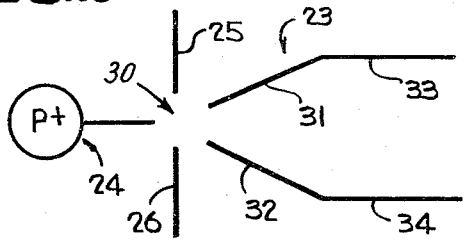
Figure 11:
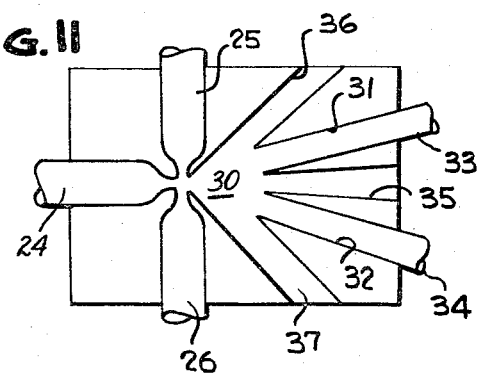
Figure 12:
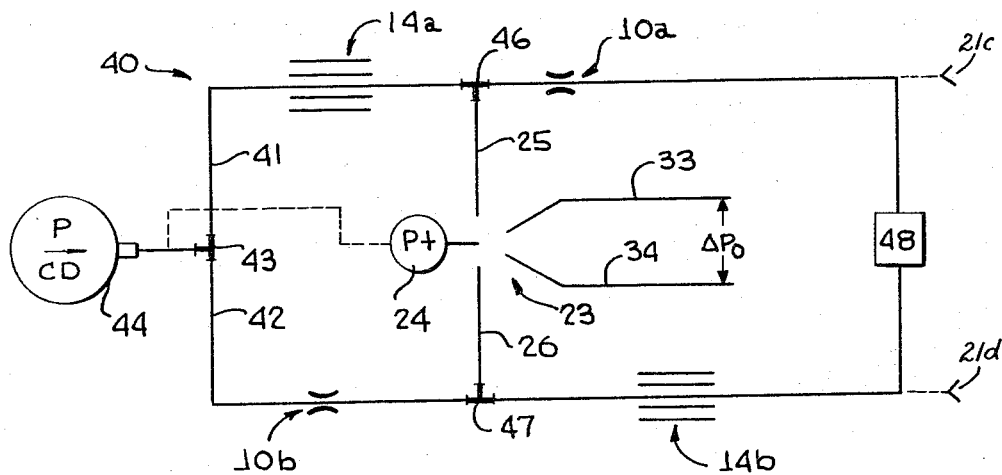
Figure 13:
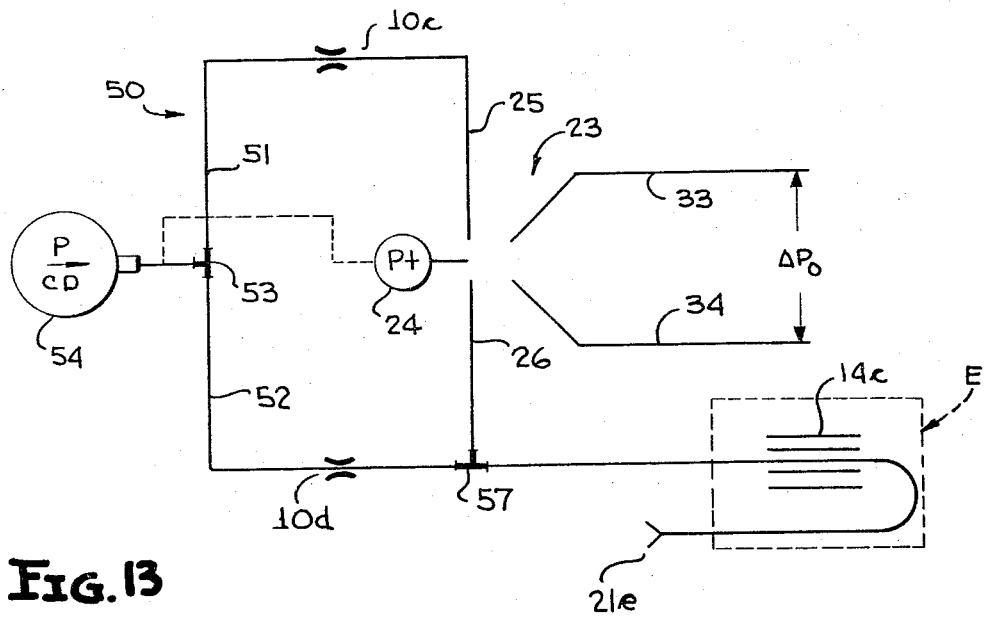

FIGURE 4 symbolically represents a laminar-flow-type of restriction element;

FIGURES 5 and 5A are respectively a partial sectional side view and an end view of one possible physical embodiment represented by the symbol illustrated in FIGURE 4;

FIGURES 6 and 6A are respectively a partial sectional side view and an end view of another physical embodiment that is represented by the symbol shown in FIGURE 4;

FIGURES 7 and 7A respectively illustrate a partial sectional side view and an end view of another possible physical embodiment that is represented by the symbol shown in FIGURE 4;

FIGURE 8 is a symbolical representation of an end of a tube, passage or channel for venting fluid therein to a region of atmospheric or ambient pressure;

FIGURE 9 illustrates a typical physical embodiment represented by the symbol shown in FIGURE 8;

FIGURE 10 symbolically represents a pure fluid amplifier of the analog type;

FIGURE 11 is a plan view of a typical type of pure fluid analog amplifier;

FIGURE 12 symbolically illustrates a temperature sensing and measuring system constructed in accordance with the instant invention; and FIGURE 13 symbolically illustrates another embodiment of a temperature sensing and measuring system of this invention.

Figure 1:
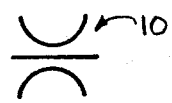
FIGURE 1 is a symbolical representation of an orifice-type flow restriction element.
Figure 2:
FIGURES 2 and 2A are respectively side and end views of one physical embodiment of the symbol as illustrated in FIGURE 1.
Figure 2A:

Referring now to the accompanying drawings for a more complete understanding of the instant invention, FIGURE 1 illustrates schematically what will hereinafter be referred to as an "orifice restriction element," the element being designated by reference numeral 10. FIGURES 2 and 2A illustrate a typical physical embodiment of this type of restriction element as comprising a tube 11 for conveying or transporting fluid supplied to the tube, and an annular constriction 12 formed by the interior walls of the tube 11 to provide an orifice-type of restriction element to gas flow through the tube 11.

Figure 3:
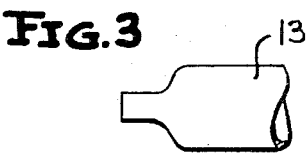
FIGURES 3 and 3A are respectively side and end views of another physical embodiment which may be represented by the symbol shown in FIGURE 1.
Figure 3A:
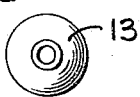

FIGURES 3 and 3A illustrate what will hereinafter be referred to as a simple nozzle 13 which may have a "simple orifice characteristic." The term "simple orifice characteristic" considered in relation to the orifice of a control nozzle, refers to control nozzles in which the flow of fluid through the orifice is proportional to the square root of the pressure applied to the fluid to force the fluid through the orifice. Thus, when a nozzle has a simple orifice characteristic and is used in a pure fluid analog amplifier (such as illustrated in FIGURE 11 of the accompanying drawings) to displace the power stream, there will be negligible or zero flow into or out of the nozzle when there is zero or essentially ambient pressure in the tube or channel connected to the nozzle. If fluid egresses from the nozzle, or if there is movement of fluid into the nozzle from the power stream during operation of the analog amplifier in the absence of a positive or negative pressure signal applied to the control nozzle, the orifice of the control nozzle is not considered as possessing a simple orifice characteristic.

Referring now to FIGURE 4, there is shown a linear or laminar flow type of restriction element designated by the numeral 14. FIGURES 5 and 5A show one possible physical embodiment of such an element as comprising a porous plug 15 which is fitted into a fluid conveying tube or passage 16, the porosity of the plug being such that regardless of the disturbances or vorticity in gas flow upstream of the plug 15, the flow within and downstream of the restriction is essentially laminar and the drag on the gas is a laminar viscous drag.

FIGURES 6 and 6A illustrate another possible physical embodiment which may be properly represented by the laminar flow symbol 14. In this embodiment, a tube 17 in which the gas is received and conveyed has inserted herein a series of parallel equi-diametered hollow tubes 18 which reduce the minimum dimension at right angles to gas flow in the flow passage, causing a laminar viscous drag. The tubes 18 thereby serve as a linear or laminar flow restriction to gas flowing therethrough.

FIGURES 7 and 7A illustrate another physical embodiment of a laminar restriction element, designated by the numeral 14 in FIGURE 4. This embodiment comprises a tube 19 in which the fluid is received and conveyed and a plurality of closely spaced-apart flat plates 20 having the ends thereof embedded in the interior walls of the tube 19, the plates 20 serving to produce laminar viscous drag between the plates.

The impedance to gas flow through the restriction 14 increases as the porosity of the plug 15 is decreased, as the diameter of the tubes 18 are decreased and as the plates 20 are spaced closer together. Conversely, the impedance of the element 14 decreases as the porosity of plug 15 increases, as the diameter of the tubes 18 increases and as the spacing between plates 20 increases.

FIGURE 10 schematically illustrates a pure fluid amplifier of the analog type as it is commonly known and referred to by those working in the art. The amplifier may take the form such as shown in FIGURE 11 or take some other form as will be apparent to those skilled in the art. Basically, this type of pure fluid amplifier comprises a power nozzle 24, a pair of opposed control nozzles 25 and 26, an interaction chamber 30, and plural output passages 31 and 32 located downstream of the interaction chamber 30, the passages 31 and 32 having tubes 33 and 34, respectively, threadedly connected therein to receive fluid from the output passages 31 and 32, respectively.

The passage 35 may also be provided intermediate the output passages 31 and 32 to receive fringe portions of fluid from the displaced power stream issuing from the power nozzle 24 so that the passages 31 and 32 receive essentially only fluid from the power stream which has been displaced into those passages by control stream flow. Passages 36 and 37 are also provided and vent to an ambient pressure environment or to a sump, such as the sump 48 shown in FIGURE 12, thereby maintaining the pressure along the sidewalls defining the passages 36 and 37 at ambient pressure. The position of the power stream in the interaction chamber 30 will be dependent upon the relative magnitudes of the control jets issuing from the control nozzles 25 and 26. As mentioned hereinabove, one of the control nozzles, or both of the control nozzles may be provided with a simple orifice characteristic so that when there is zero signal amplitude in the control nozzle, there is zero flow from and into that control nozzle as the power stream issues from the power nozzle 24. The fluid employed as the working fluid in the amplifier 23 may be either a gas or a liquid, as a matter of choice.

FIGURE 12 of the drawings illustrates a temperature measuring system 40 formed by a pair of tube sections or fluid conveying passages 41 and 42 joined at a T junction 43 to a source 44 for supplying a gas such as air, filtered of extraneous foreign matter at some constant predetermined pressure to the sections 41 and 42. If gas is to be employed as the working fluid in the amplifier 23, the power nozzle 24 of the amplifier 23 may be connected to the source 44 as indicated by the dotted line connection. The control nozzles 25 and 26 of the amplifier 23 are connected at junctions 46 and 47, respectively, to receive gas from the sections 41 and 42, respectively.

The tube section 41 is provided with a laminar flow type of restriction 14a and an orifice type flow restriction 10a, the restriction 14a being positioned between the junctions 43 and 46 and the restriction 10a being positioned between the junction 46 and a sump 48 connected to receive fluid from the tube section 41. With regard to the tube section 42, an orifice restriction 10b is formed in the tube between the junctions 43 and 47 whereas a laminar flow restriction 14b is located between the junction 47 and the sump 48 and is connected to receive fluid from a venting end 21d of the tube 42. If so desired, the sump 48 may be dispensed with, the venting ends 21c and 21d of the tube sections 41 and 42, respectively, venting the gas in the tubes to an environment at ambient pressure.

As mentioned hereinabove, the resistance of an orifice restriction decreases with an increase in temperature whereas an increase in temperature of gas flowing through a laminar restriction increases the resistance of the laminar restriction to gas flow. Also, for relatively small changes of temperature, the relationship between temperature change and viscosity change is essentially linear.

The system 40 is designed to measure the temperature of gas flowing from the source 44 into the tubes 41 and 42. Assuming that the temperature of the gas at a pressure $P_i$ increases from an initial temperature $T_i$ an amount $\Delta T$, the viscosity of the gas increases an amount corresponding to the increase in temperature $\Delta T$, causing an increase of corresponding magnitude in the viscous drag of the gas through the laminar restriction 14a. As a result, the restriction 14a now offers a greater resistance to volume flow and the pressure at the junction 46 and in the control nozzle 25 falls below the initial value $P_i$ since the resistances to volume flow offered by the orifice restriction 10a and the amplifier control nozzle 25 restriction decrease with an increase in temperature.

Conversely, in the tube section 42, the pressure at the junction 47 and in the control nozzle 26 rises an amount corresponding to the incremental temperature increase, $\Delta T$, because the impedance offered to gas flow by the laminar restriction 14b increases, whereas there is a decrease in volume flow resistance offered by the orifice restriction 10b and control nozzle 26. The greater differential pressure between control nozzles 25 and 26 will effect displacement of the power stream issuing from the power nozzle 24 of the amplifier 23 so that there will be a greater pressure differential between output passages 33 and 34. As will be apparent, this differential in pressure $\Delta P_o$, will be a function of the increase in temperature $\Delta T$ of gas flowing in the tubing system. For some predetermined null temperature about which the system 40 is designed to function, and assuming that the amplifier 23 is symmetrical about a centerline through the power nozzle 24 and the central output passage 35, the output from the amplifier 23 will typically be a null differential pressure output since the pressures in the control nozzles 25 and 26 will be equal at this null temperature.

FIGURE 13 illustrates another embodiment, referred to by the numeral 50, of a temperature measuring system. In this embodiment, tube sections 51 and 52 are connected to a T junction 53 which receives gas at some constant predetermined pressure and temperature from a source 54. The source 54 may also be connected to the upstream end of the power nozzle 24 as indicated by the dotted line connection to supply gas to that nozzle if gas is to be employed as the working fluid in the amplifier 23. An orifice restriction 10c is formed in the tube 51 between the junction 53 and control nozzle 25, whereas an orifice restriction 10d is formed in the tube 52 between the junctions 53 and 57 and the control nozzle 26.

A laminar flow restriction 14c is formed in the tube section 52 downstream of the junction 57 and discharges gas to ambient pressure through a venting end 21e. The laminar restriction 14c is designed for insertion into an environment E, it being desired to measure the temperature of the environment E with the system 50 and is therefore preferably formed by lengths of capillary tubing to facilitate heat transfer between the environment E and gas flow through the restriction 14c.

The control nozzle 25 is provided with a simple orifice characteristic as described hereabove. In addition, the restriction 10c is designed to have a higher resistance to gas flow than the restriction 10d so that no pressure difference exists between the nozzles 25 and 26 for the null temperature condition. The orifice of the control nozzle 26 may or may not be formed with a simple orifice characteristic since the pressure in the control nozzle is to be varied and governed by the pressure at the junction 57 between the restrictions 10d and 14c.

The system illustrated in FIGURE 13 senses and measures temperature changes in the environment E by varying the resistance to gas flow from the junction 57 to the venting end 21e of the tube section 52 preferably by means of one capillary type of laminar restriction provided by a single length of tube. The increase in resistance to gas flow through a capillary type restriction 14c is caused by two factors. First, and as discussed above in describing the operation of the system 40, the viscous drag effects received by gas flowing through the capillary restriction increases with increasing gas temperature. The second factor is that the volume of gas in the restriction expands as the temperature increases and because the resistance increase of a gas in a capillary restriction is proportional to the viscosity times the velocity of the gas, the resistance becomes greater for both reasons. The velocity of a gas also increases as the temperature increases and the temperature expansion effect produced in the restriction 14c thereby increases the resistance to flow between the orifice restriction 10d and the venting end 21e. By providing relatively long capillary tubes for temperature sensing rapid heat transfer can take place between fluid in the environment E and gas in the restriction 14c, whereby thermal expansion effects are also produced in the restriction.

The pressure of gas issuing from the control nozzle 25 provides a pressure bias signal which remains relatively constant and is determined by the pressure of the gas supplied to the tube 51 by the source 54. The pressure of gas in the control nozzle 26, however, increases as the resistance to flow through the restriction 14c increases, and the resistance to flow through the latter restriction is a function of the temperature increase in the environment E. Thus, the differential in pressures between the control streams issuing from the control nozzles 25 and 26 will be functions of the temperature increases in the environment E and these control streams will produce corresponding amplified pressure differentials in the output tubes 33 and 34 of the amplifier 23. For example, if the pressure in the control nozzle 26 exceeds that in the control nozzle 25 the power stream issuing from the power nozzle 24 will be displaced a proportionate amount into the output passage 33 so that a proportional, amplified pressure differential will be created in the passages 33 and 34.

If the temperature of the environment E is less than the temperature of the fluid supplied to the tube sections 51 and 52 by the source 54, the heat transfer in the restriction 14c obviously will be from the restriction to the environment E. Decreases in temperature of the gas in the restriction 14c will correspondingly reduce the resistance to flow and consequently correspondingly reduce the pressure at the junction 57. As a result, the pressure of the fluid in the control nozzle 26 will be lower than that in the nozzle 25 so that a greater proportion of the power stream issuing from the power nozzle 24 will be displaced into the output passage 34. The pressure differential between the passages 33 and 34 can be adjusted by properly choosing orifices 10c and 10d to have zero pressure difference for any desired null temperature.

If desired, the pressure differentials in the output passages of the pure fluid amplifiers in the embodiments illustrated in FIGURES 12 and 13 may be supplied to control or operate other types of devices such as visual temperature indicators or servo systems for varying the temperature of gas in the tubing system (FIGURE 12) or in an environment (FIGURE 13) that is being temperature controlled.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A temperature measuring system comprising in combination, a pure fluid amplifier of the analog type including a power nozzle for issuing a constricted fluid power stream and a pair of substantially opposed control nozzles for issuing opposing control jets in interacting relationship with the power stream; a source of gas at constant pressure; means connected to said source for receiving gas at some constant pressure therefrom; orifice and laminar flow type restriction elements formed in series in said means, means connected between a point between the two types of flow restriction elements and one control nozzle of said pair for supplying fluctuations in pressure to said one control nozzle resulting from fluctuations in the temperature of the gas flowing through said elements, and means for conveying gas from said source to the other control of said pair at some predetermined pressure.

2. The system as claimed in claim 1 wherein said means for conveying gas from said source to the other control nozzle of said pair includes an orifice type flow restriction element.

3. A temperature measuring system comprising in combination, a pure fluid amplifier of the analog type including a power nozzle for issuing a constricted fluid power stream and a pair of substantially opposed control nozzles for issuing opposing fluid control jets in interacting relationship with the power stream; a source of gas at constant pressure; gas pressure conveying means connected to said source for receiving gas at a constant pressure therefrom; an orifice type flow restriction element formed in said means downstream of said source; a laminar flow restriction element formed in said means downstream of said orifice restriction element; the restriction elements cooperating to produce fluctuations in pressures therebetween corresponding to fluctuations in temperature of the gas flowing through said laminar restriction element, one control nozzle of said pair connected to said means intermediate the flow restriction elements; and means for supplying fluid to the other control nozzle of said pair at some predetermined pressure.

4. The temperature measuring system as claimed in claim 3 wherein said fluid is a gas.

5. The temperature measuring system as claimed in claim 3 wherein said means for supplying fluid to the other control nozzle of said pair comprises a second gas pressure conveying means coupled to receive gas from said source; and a second orifice type flow restriction element positioned in said second conveying means intermediate said other control nozzle and said source.

6. The system as claimed in claim 5 wherein the resistance to flow provided by said second orifice type flow restriction is greater than that provided by the first-mentioned orifice type flow restriction.

7. The system as claimed in claim 3 wherein at least one of said control nozzles is formed with a simple orifice characteristic.

8. A temperature measuring system comprising a source of constant pressurized gas, first and second tube sections connected to said source, an orifice type restriction element formed in each tube section downstream of said source, a laminar flow restriction element formed in said first tube section downstream of the orifice restriction for producing pressure fluctuations corresponding to temperature fluctuations in flow through said laminar flow restriction element, means for receiving pressure signals from said first tube section intermediate the orifice type flow restriction and said laminar type of flow restriction, and means for comprising the pressure differentials between said means for receiving pressure differentials from said first tube section and said second tube section downstream of the orifice restriction formed in the latter tube section.

9. The temperature measuring system as claimed in claim 8 wherein said laminar flow restriction element comprises a single capillary tube or a plurality of substantially parallel capillary tubes.

10. The temperature measuring system as claimed in claim 8 wherein said laminar flow restriction is positioned in an environment, the temperature thereof being measured.

11. A temperature measuring system comprising a pure fluid amplifier of the analog type including a power nozzle for issuing a defined power stream into the amplifier, plural output passages having the entrances thereto positioned downstream of said power nozzle for receiving fluid from the power stream, and a pair of control nozzles angularly disposed with respect to said power nozzle and positioned intermediate said power nozzle and the entrances of said output passages, said control nozzles issuing control streams for effecting amplified displacement of said power stream relative to the entrances of said output passages, a source of constant pressurized gas, first and second tube sections connected to said source, an orifice type restriction element formed in each section downstream of said source, a laminar flow restriction element formed in said first tube section downstream of the orifice restriction for producing pressure fluctuations corresponding to temperature fluctuations in flow through said laminor flow restriction element, means coupling one control nozzle of said pair to said first tube section intermediate the orifice restriction therein and said laminar flow restriction, said means supplying pressure signals to said one control nozzle, and means for coupling the orifice restriction in said second tube to the other control nozzle of said pair, said latter means supplying pressure bias signals to said second control nozzle.

12. The system as claimed in claim 11 wherein the orifice-type restriction in said second tube section provides a resistance to flow therethrough greater than that provided by the orifice restriction in said first tube section.

13. The system as claimed in claim 11 wherein additional means are provided for discharging flow egressing from said laminar flow restriction to an ambient pressure environment.

14. A temperature measuring system comprising: a source of fluid at substantially constant pressure; means connected to said source for receiving fluid at constant pressure; orifice and laminar type flow restriction elements formed in series in said means; comparing means for producing an output signal proportional to the pressure differential between two fluid streams; fluid passage means connected between a point between the two types of flow restriction elements and an input side of said comparing means, said fluid passage means being supplied with pressure variations resulting from temperature fluctuations of the fluid flowing through said flow restriction elements; further means connecting said source and another input side of said comparing means for supplying fluid to said comparing means at some predetermined pressure such that said output signal is proportional to the pressure differential between the fluid flowing in said passage passage means and the fluid flowing in said further means.

15. A system as claimed in claim 14 wherein said comparing means comprises a pure fluid amplifier of the analog type.

16. A unit for measuring the temperature of a fluid comprising: a source of fluid at substantially constant pressure; comparing means for producing an output indication which is a function of the pressure differential between two fluid pressure input streams; a first fluid flow path comprising at least an orifice-type and a laminar-type flow restriction element connected in series with said source, said laminar-type element being located such that the fluid flowing therethrough is at the temperature to be measured and the pressure in said first fluid path fluctuates as a function of the temperature of said fluid; means connected downstream of one of said restrictions in said first fluid flow path for applying the pressure-fluctuating fluid as one of said input streams to said comparing means, a second fluid flow path for conveying fluid from said source to said comparing means at some predetermined pressure, said second fluid flow path providing another of said input streams to said comparing means.

17. A unit as claimed in claim 16 wherein said comparing means comprises a pure fluid amplifier of the analog type.

References Cited by the Examiner
UNITED STATES PATENTS

| | | | |
|---|---|---|---|
| 2,263,335 | 11/1941 | Heinz | 73—23 |
| 2,589,251 | 3/1952 | Heinz | 73—37.5 |
| 3,071,160 | 1/1963 | Weichbrod | 73—205 X |
| 3,083,574 | 4/1963 | Messerly | 73—257 |
| 3,238,959 | 3/1966 | Bowles | 137—81.5 |

OTHER REFERENCES

Publication: Science and Mechanics, June 1960. "Fluid 'Transistor' Circuits May Rival Electronics," by S. David Pursglove, pp 81–84.

LOUIS R. PRINCE, *Primary Examiner.*

D. M. YASICH, *Assistant Examiner.*